(12) United States Patent
Eser et al.

(10) Patent No.: US 12,070,985 B2
(45) Date of Patent: Aug. 27, 2024

(54) THERMAL MANAGEMENT SYSTEM, VEHICLE AND METHOD FOR OPERATING TWO COOLING CIRCUITS OF A THERMAL MANAGEMENT SYSTEM

(71) Applicant: Vitesco Technologies GmbH, Regensburg (DE)

(72) Inventors: Gerhard Eser, Munich (DE); Sebastian Brettner, Munich (DE); Manuel Dillinger, Munich (DE); Markus Feulner, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 220 days.

(21) Appl. No.: 17/627,581

(22) PCT Filed: Jul. 16, 2020

(86) PCT No.: PCT/EP2020/070216
§ 371 (c)(1),
(2) Date: Jan. 14, 2022

(87) PCT Pub. No.: WO2021/009318
PCT Pub. Date: Jan. 21, 2021

(65) Prior Publication Data
US 2022/0274458 A1    Sep. 1, 2022

(30) Foreign Application Priority Data

Jul. 17, 2019  (DE) .................. 10 2019 210 577.7

(51) Int. Cl.
*B60H 1/00* (2006.01)
*B60H 1/08* (2006.01)
*B60K 11/04* (2006.01)

(52) U.S. Cl.
CPC ......... *B60H 1/00278* (2013.01); *B60H 1/004* (2013.01); *B60H 1/00485* (2013.01); *B60H 1/08* (2013.01); *B60K 11/04* (2013.01)

(58) Field of Classification Search
CPC ............... B60H 1/00278; B60H 1/004; B60H 1/00485; B60H 1/08; B60K 11/04
See application file for complete search history.

(56) References Cited

U.S. PATENT DOCUMENTS

| 8,402,776 B2 | 3/2013 | Johnston |
| 2016/0107501 A1 | 4/2016 | Johnston |
| (Continued) | | |

FOREIGN PATENT DOCUMENTS

| CN | 102954615 | 3/2013 |
| CN | 106080225 | 11/2016 |
| (Continued) | | |

OTHER PUBLICATIONS

Office Action dated Jan. 5, 2023 issued in Japanese Patent Application No. 2022-502599.

(Continued)

*Primary Examiner* — Henry T Crenshaw
*Assistant Examiner* — Kamran Tavakoldavani
(74) *Attorney, Agent, or Firm* — Cozen O'Connor (57) ABSTRACT

A thermal management system for use in a vehicle includes a first cooling circuit for cooling a battery; and a second cooling circuit for cooling an electric motor configured to drive the vehicle. The first and second cooling circuits are connected to each other: (a) in series by a multi-way valve in a first mode of the thermal management system and in a first valve position of the multi-way valve, or (b) in parallel in a second mode of the thermal management system and in a second valve position of the multi-way valve. In a third mode of the thermal management system and in a third valve (Continued)

position, the multi-way valve is configured to take up an intermediate position in which coolant flows of the first and second cooling circuits are mixed with each other as needed.

17 Claims, 7 Drawing Sheets

(56) References Cited

U.S. PATENT DOCUMENTS

2016/0318370 A1* 11/2016 Rawlinson ......... B60H 1/32281
2016/0344075 A1* 11/2016 Blatchley ................. B60K 1/00

FOREIGN PATENT DOCUMENTS

| CN | 106207225 | 12/2016 |
|---|---|---|
| CN | 108437737 | 8/2018 |
| CN | 108725134 | 11/2018 |
| CN | 108909457 | 11/2018 |
| DE | 101 55 387 | 5/2003 |
| EP | 3 088 230 | 11/2016 |
| EP | 2 392 486 | 4/2018 |
| JP | 2008-037302 | 2/2008 |
| JP | 2011-255879 | 12/2011 |
| JP | 2014-061873 | 4/2014 |
| JP | 2015-131563 | 7/2015 |
| JP | 2015-154521 | 8/2015 |
| JP | 2018-536128 | 12/2018 |
| WO | WO 2018/028299 | 2/2018 |
| WO | WO 2018/064054 | 4/2018 |
| WO | WO 2019/022023 | 1/2019 |

OTHER PUBLICATIONS

International Search Report dated Oct. 27, 2020 in corresponding PCT Application PCT/EP2020/070216.
Written Opinion issued in corresponding PCT Application PCT/EP2020/070216.
German Office Action issued in corresponding DE Application No. 10 2019 210 577.7 on Jun. 29, 2020.
Office Action dated May 21, 2024 issued in Chinese Patent Application No. 202080051487.X.

* cited by examiner

THERMAL MANAGEMENT SYSTEM, VEHICLE AND METHOD FOR OPERATING TWO COOLING CIRCUITS OF A THERMAL MANAGEMENT SYSTEM

CROSS REFERENCE TO RELATED APPLICATIONS

This is a U.S. national stage of International application No. PCT/EP2020/070216, filed on Jul. 16, 2020, which claims priority to German Application No. 10 2019 210 577.7 filed Jul. 17, 2019, the content of each of which is incorporated herein by reference.

BACKGROUND OF THE INVENTION

1. Field of the Invention

The invention relates to a thermal management system for use in a vehicle. The invention also relates to a vehicle with such a thermal management system. The invention also relates to a method for operating two cooling circuits of such a thermal management system.

2. Description of the Related Art

A vehicle should be understood here as meaning any type of vehicle which has at least one first cooling circuit for controlling the temperature of a battery and at least one second cooling circuit for controlling the temperature of an electric motor and power electronics. This may be a partially electric or fully electric vehicle, but in particular passenger cars and/or utility vehicles.

In such vehicles, two separate cooling or water circuits are required. A first cooling or water circuit is operated at a lower temperature for controlling the temperature of the battery, while a second cooling or water circuit is operated at a higher temperature for controlling the temperature of the electric motor and power electronics. Complex control strategies are responsible for ensuring that the components are heated up to their optimal temperature as quickly as possible without subsequently overheating during operation.

A thermal management system of the type described above is known from EP 2392486 B1.

SUMMARY OF THE INVENTION

It is an object of the invention to improve such a thermal management system.

This object is achieved by a thermal management system for use in a vehicle, wherein the thermal management system comprises a first cooling circuit for a battery and a second cooling circuit for an electric motor for driving the vehicle. The two cooling circuits are connected to each other here in series by a multi-way valve in a first mode of the system and in a first valve position of the multi-way valve (series connection mode) or in parallel in a second mode of the system and in a second valve position of the multi-way valve (parallel connection mode).

In one aspect, in a third mode of the system and in a third valve position, the multi-way valve takes up an intermediate position in which the coolant flows of the two cooling circuits are mixed with each other as needed (needs-based mixing mode).

With such needs-based mixing, waste heat or heat loss from the electric motor cooling circuit can advantageously be dissipated to the battery cooling circuit without a sudden transition behavior of the system being experienced, the transition behavior arising as such when switching between the series connection mode and the parallel connection mode and being expressed in the form of sudden changes in temperature and pressure. In addition, frequent switching between the series connection mode and the parallel connection mode can be avoided during transient journeys in which the electric motor heats up quickly.

Such a needs-based mixing accordingly improves the temperature control of both the electric motor cooling circuit and the battery cooling circuit.

In another aspect, a third valve position can be set from a plurality of possible intermediate positions. The individual intermediate positions can be set in increments (or discontinuously) or infinitely variably (or continuously). An infinitely variable setting capability assists the temperature control of both the electric motor cooling circuit and the battery cooling circuit.

In one aspect, the multi-way valve can be configured in the form of a 4/2-way valve. A further multi-way valve is provided in the second cooling circuit (or electric motor cooling circuit) downstream of the electric motor, which conducts a coolant flow optionally via a path with a radiator or a radiator path and/or via a path parallel thereto, or bypass path, for bypassing the radiator. The further multi-way valve can also be set in increments or infinitely variably into a plurality of possible positions—i.e., end and intermediate positions. The further multi-way valve can be configured in the form of a 3/2-way valve.

In another aspect, the multi-way valve can be configured in the form of a 5/3-way valve which is fluidically connected to a bypass path of the second cooling circuit (or electric motor cooling circuit) for bypassing a radiator and to a path parallel thereto with a radiator, or radiator path, wherein the bypass path and the radiator path originate from a junction downstream of the electric motor.

In another aspect, a vehicle is provided with a thermal management system of the previously described type.

In another aspect, a method for operating two cooling circuits of a thermal management system of the previously described type is provided, in which a first cooling circuit is provided for a battery and a second cooling circuit for an electric motor for driving the vehicle. The two cooling circuits are connected to each other here in series by a multi-way valve in a first mode of the system and in a first valve position of the multi-way valve or in parallel in a second mode of the system and in a second valve position of the multi-way valve.

In another aspect, in a third mode of the system and in a third valve position, the multi-way valve is switched into an intermediate position in which the coolant flows of the two cooling circuits are mixed with each other as needed.

The third valve position is set from a plurality of possible intermediate positions. The individual intermediate positions can be set in increments or infinitely variably.

In a first aspect, a 4/2-way valve is used as the multi-way valve. A further multi-way valve is used in the second cooling circuit (or electric motor cooling circuit) downstream of the electric motor, through which a coolant flow is optionally conducted via a path with a radiator, or radiator path, and/or via a path parallel thereto, or bypass path, for bypassing the radiator. The further multi-way valve can also be set here in increments or infinitely variably into a plurality of possible positions—i.e., end and intermediate positions. A 3/2-way valve can be used here for the further multi-way valve.

In an alternative second aspect, a 5/3-way valve is used as the multi-way valve, which is fluidically connected to a bypass path of the second cooling circuit (or electric motor cooling circuit) for bypassing a radiator, and to a path parallel thereto with a radiator, or radiator path, wherein the bypass path and the radiator path originate from a junction downstream of the electric motor.

A fourth mode and/or a fifth mode of the system can advantageously also be set by the first aspect or the second aspect. In the fourth mode (or bypass mode) of the system, the radiator path can be bypassed for heating the battery. In the fifth mode of the system, by contrast, the battery circuit can be cooled via the radiator path in order to avoid overheating of the battery.

A computer program for carrying out the method described above is also proposed. The computer program can be read from a computer readable medium, into control electronics or a controller and then used to control the thermal management system accordingly.

The control electronics system here can have a digital microprocessor unit (CPU) connected in terms of data to a storage system and to a bus system, a random access memory (RAM) and also a storage. The CPU is configured to execute commands, which are embodied as a program stored in a storage system, to detect input signals from the data bus and to output signals to the data bus. The storage can have various storage media in the form of magnetic, solid-state and other non-volatile media on which a corresponding computer program for carrying out the method and the advantageous configurations is stored. The program can be configured such that it embodies or is able to execute the methods described here such that the CPU can execute the steps of such methods and thus control the thermal management system.

In addition, a computer-readable medium storing a computer program product is proposed, comprising program code which are stored on the computer-readable data storage medium in order to carry out the method described above when the program code is executed on a computer or in a CPU.

BRIEF DESCRIPTION OF THE DRAWINGS

The invention will be explained below in detail with reference to illustrations in figures. Further advantageous developments of the invention are apparent from the dependent claims and the description below of preferred embodiments. For this purpose, in the figures:

DETAILED DESCRIPTION OF THE PRESENTLY PREFERRED EMBODIMENTS

Figure 1:
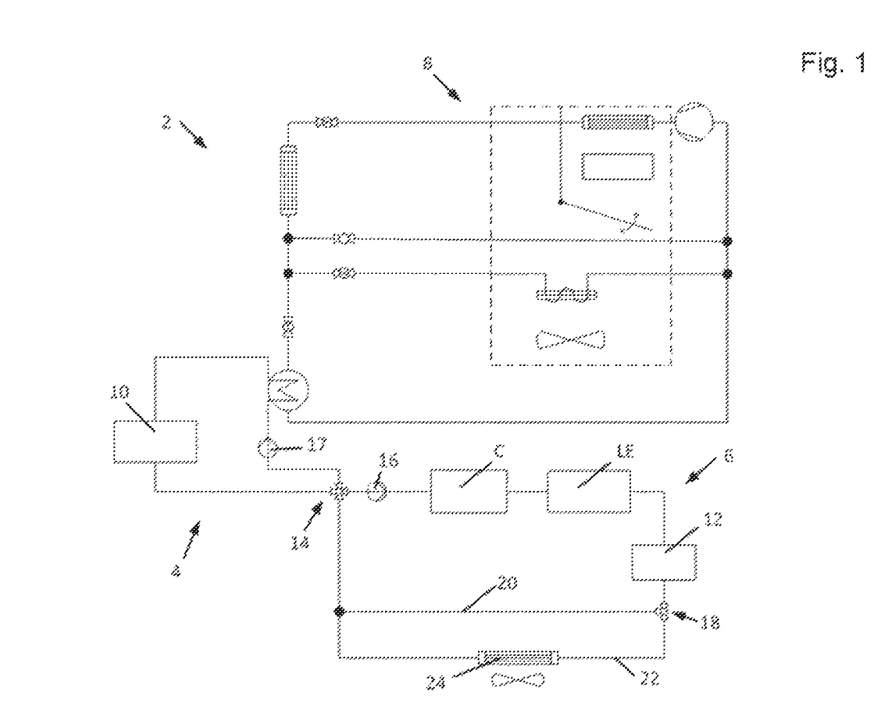
FIG. 1 shows a thermal management system in a proposed first embodiment.
Figure 2:
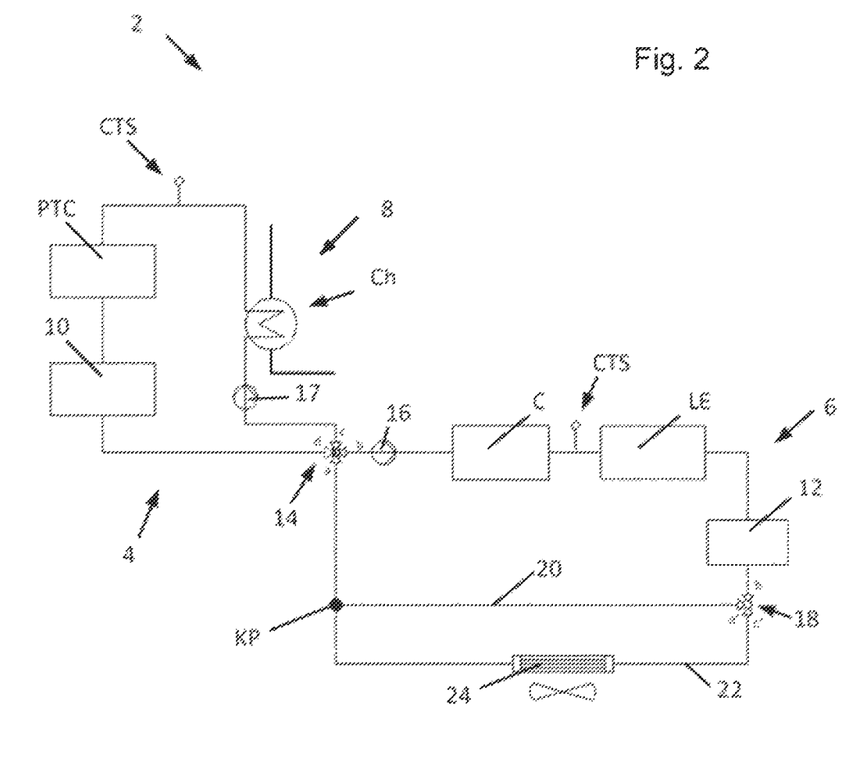
FIG. 2 shows an extract from the thermal management system shown in FIG. 1.

The thermal management system 2 according to FIG. 1 and FIG. 2 illustrates a first cooling circuit 4 for a battery 10 and a second cooling circuit 6 for an electric motor 12 for driving the vehicle, as well as a refrigerant circuit 8 of an air conditioning system. The vehicle can be, for example, a battery electric vehicle (Battery Electric Vehicle, for short: BEV), a hybrid electric vehicle (Hybrid Electric Vehicle, for short: HEV) or a fuel cell vehicle (Fuel Cell Electric Vehicle, for short: FCEV). These three different circuits 4, 6, 8 merge to a certain extent with one another. The respective fluid is conveyed in the two cooling circuits 4, 6 by a dedicated electric pump 16, 17.

The electric motor 12 and the power electronics LE should be operated at a coolant or cooling water temperature of approx. 85° C. The battery 10 or the battery cells, by contrast, should be operated in a specific coolant or cooling water temperature window between 20° C. and 40° C. because this ensures an optimal operating temperature range for the battery 10. The temperature of the battery 10 or of the individual battery cells themselves can definitely exceed the 40° C. temperature threshold. The two cooling circuits 4, 6 are therefore required. The two cooling circuits 4, 6 have to be able to both absorb and dissipate heat. While the battery cooling circuit 4 is cooled via a heat exchanger Ch (cf. FIG. 1; see chiller, for short: Ch) in relation to the refrigerant circuit 8, the electric motor cooling circuit 6 can be cooled in relation to the environment via a radiator 24 and in relation to the battery cooling circuit 4 via a multi-way valve 14 described below (Coolant Flow Control Valve, for short: CFCV), wherein the multi-way valve 14 is an interface between the battery cooling circuit 4 and the electric motor cooling circuit 6. The battery cooling circuit 4 can also be cooled via the radiator 24 in an appropriate valve position of the multi-way valve 14. However, since the battery coolant should not exceed a temperature of 40° C., the cooling via the radiator 24 is usually insufficient, and therefore heat has to be dissipated via the heat exchanger Ch. In addition to the electric motor 12 and the power electronics LE, a charger (for short: C) is also to be cooled in the electric motor cooling circuit 6. A temperature sensor CTS is provided for controlling the respective cooling circuit 4, 6. A resistance heater PTC is also provided in the battery cooling circuit 4. The electric motor 12 is either water-cooled or oil-cooled. In the latter case, a corresponding oil cooling circuit of the electric motor 12 is connected to the motor cooling circuit 6 by a heat exchanger (not shown).

The thermal management system 2 can be operated in different modes by the multi-way valve 14. The multi-way valve 14 here is part of what is referred to as an actuator or cooling water control valve, which as such also comprises a drive with an electric servomotor and a controller for controlling the electric servomotor.

In a first mode of the system (Use Case 1, for short: UC1=series connection R with maximum heat recovery) and in a first valve position of the multi-way valve 14, the cooling circuit 4 can be connected in series with the cooling circuit 6. With respect to the multi-way valve 14, coolant flows via an inlet or input a from the cooling circuit 6 via the outlet or output c into the cooling circuit 4 and finally via the inlet or input d from the cooling circuit 4 via the outlet or output b back into the cooling circuit 6.

This series connection causes the battery cooling circuit 4 to heat rapidly, utilizing the waste heat from the electric motor 12 and the power electronics LE. The electric motor cooling circuit 6 thus also has the function of a heating circuit.

In a second mode of the system (Use Case2, for short: UC2=parallel connection P with overheating protection) and in a second valve position of the multi-way valve 14, the cooling circuit 4 can be connected parallel to the cooling circuit 6, such that the two cooling circuits 4, 6 are fluidically separated from each other. This separation protects the battery 10 from overheating.

In addition, a third mode of the system (Use Case 3, for short: UC3=mixing mode M with selective heat recovery) is also proposed, in which the multi-way valve 14 is switched to an intermediate position—i.e., a third valve position—in which the coolant flows of the two cooling circuits 4, 6 are mixed with each other as needed.

Such a mixing mode allows both the temperature of the battery 10 and the temperature of the electric motor 12 to be controlled more precisely. There are no high pressure and temperature jumps in the two cooling circuits 4, 6, since there is no switching between the series connection mode R and the parallel connection mode.

In a first embodiment (cf. FIG. 1 and FIG. 2), the multi-way valve 14 is designed in the form of a 4/2-way valve, via which the previously described system modes and valve positions can be set or controlled. Here, in the cooling circuit 6 downstream of the electric motor 12, a further multi-way valve 18 in the form of a 3/2-way valve is also provided, the outlet or output of which a1 is fluidically connected to the inlet or input a of the 4/2-way valve 14. The multi-way valve 18 is also part of a further actuator or cooling water control valve, which as such also comprises a drive with an electric servomotor and a controller for controlling the electric servomotor.

By the 3/2-way valve 18, a coolant flow can optionally be conducted via a path 22 with a radiator 24 and/or via a path 20 parallel thereto—bypass path 20—for bypassing the radiator 24.

Figure 4:
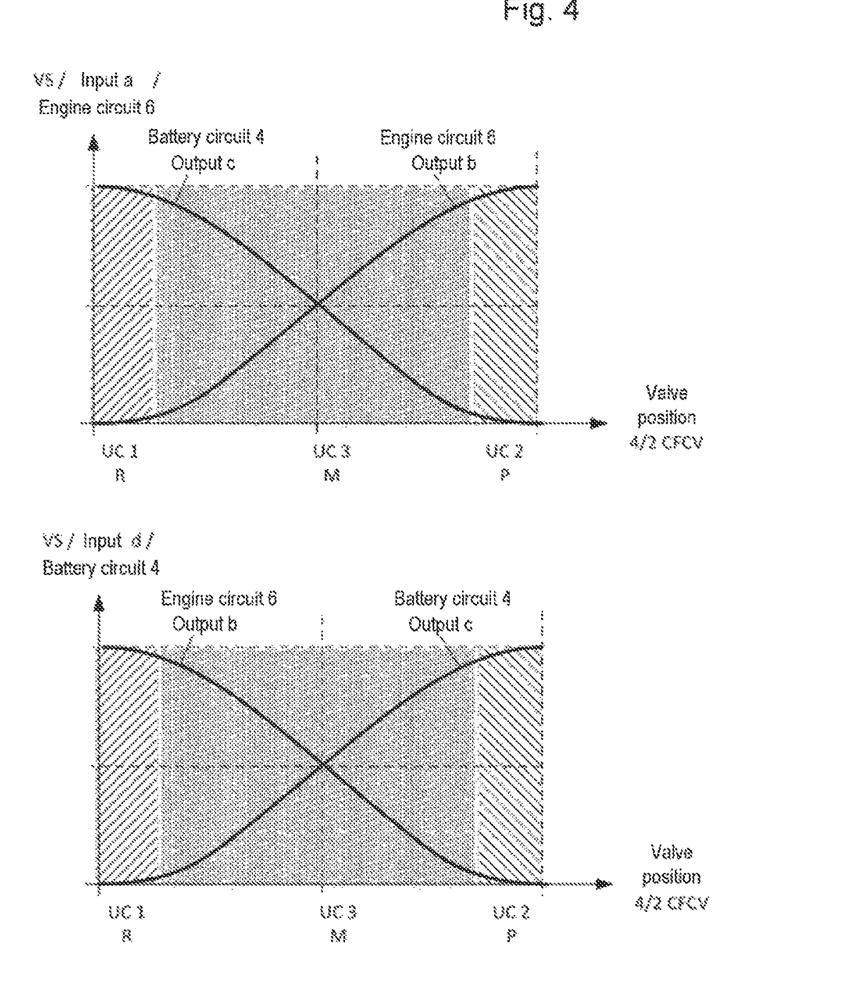
FIG. 4 shows a first and second illustration of volume flows at a 4/2-way valve of the proposed first embodiment.

FIG. 4 illustrates the volume flows VS, which can be set with respect to the 4/2-way valve of the first embodiment. The input a and the two outputs b, c are seen here on the left of the graph. By contrast, input d and the two outputs b, c are seen on the right of the graph. In the two graphs, a left and right area are each shown without a significant change in terms of the volume flows. The left area describes the UC1 mode or the series connection R. The right area, on the other hand, describes the UC2 mode or the parallel connection P.

Between these two modes, a middle area with a multiplicity of intermediate positions of the valve 14 can be controlled so as to bring about a needs-based mixing of the coolant flows of the cooling circuits 4, 6 (mixing mode M=UC3). In principle, discrete intermediate positions can be set in increments. As an alternative thereto, the intermediate positions can also be set, however, infinitely variably or continuously over the entire middle area in order to enable even more precise control of the temperature both of the battery 10 and the electric motor 12.

Figure 3:
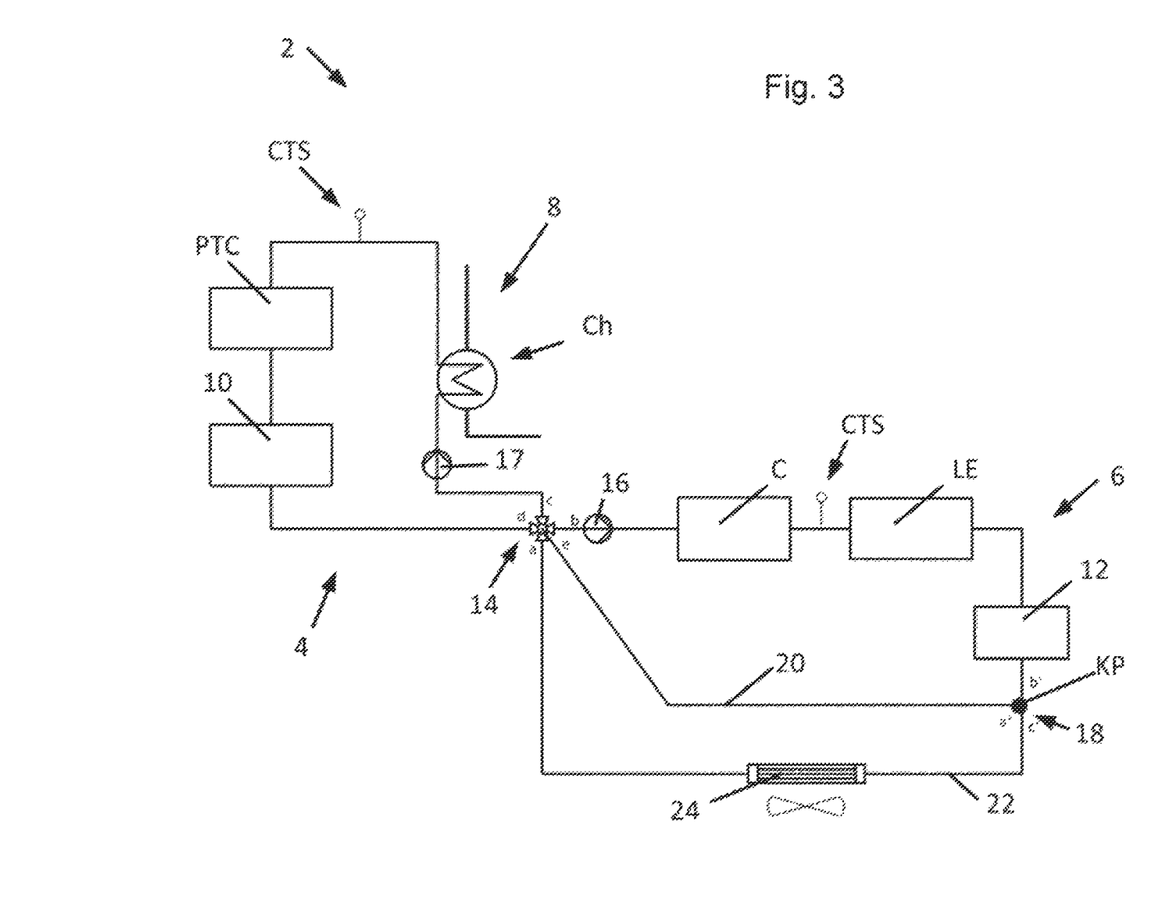
FIG. 3 shows a thermal management system in a proposed second embodiment.

In an alternative second embodiment (cf. FIG. 3), the multi-way valve 14 is configured in the form of a 5/3-way valve. An inlet or input e of the 5/3-way valve that protrudes from the plane in FIG. 3 should also be imagined here, which inlet or input as such is fluidically connected via a bypass path 20 to a junction KP (or the outlet $a^I$ thereof) downstream of the electric motor 12, wherein both the bypass path 20 and a path 22 parallel thereto with a radiator 24 originate from the junction KP. The radiator path 22 fluidically connects the junction KP (or the outlet $c^I$ thereof) to the inlet or input a of the 5/3-way valve.

Figure 6:
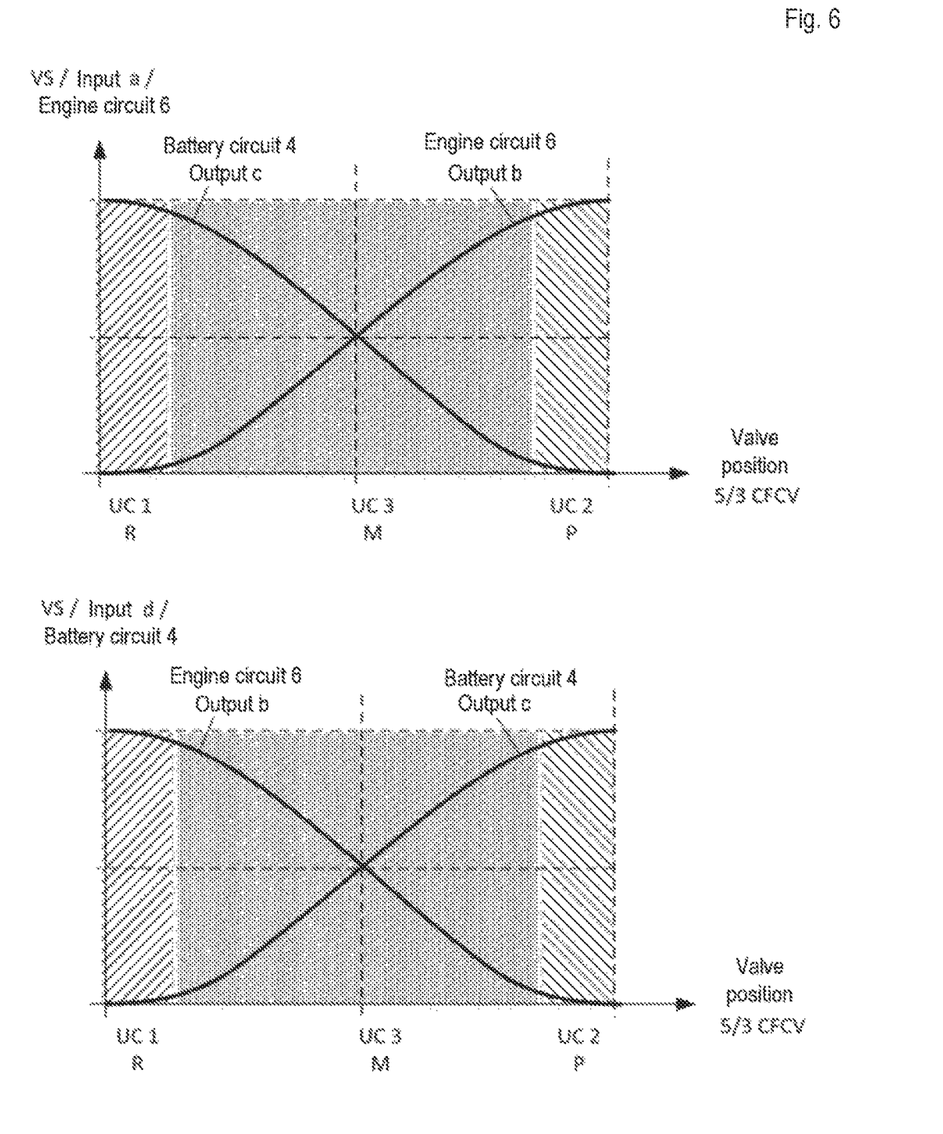
FIG. 6 shows a first and second illustration of volume flows at a 5/3-way valve of the proposed second embodiment.

FIG. 6 illustrates—analogously to FIG. 4—the volume flows VS which can be set with respect to the 5/3-way valve of the second embodiment. The input a and the two outputs b, c are seen here on the left of the graph. By contrast, input d and the two outputs b, c are seen on the right of the graph. Also in these two graphs, a left and right area are each illustrated without a significant change in terms of the volume flows. The left area describes the UC1 mode or the series connection R. The right area, on the other hand, describes the UC2 mode or the parallel connection P.

Between these two modes, a middle area with a multiplicity of intermediate positions of the valve 14 can be controlled in order to bring about a needs-based mixing of the coolant flows of the cooling circuits 4, 6 (mixing mode M=UC3). Analogously to what has been stated above, discrete intermediate positions can in principle be set in increments. As an alternative thereto, the intermediate positions can also be set infinitely variably or continuously over the entire middle area so as to enable even more precise control of the temperature both of the battery 10 and the electric motor 12.

With regard to the two proposed embodiments, the additional path 20 makes it possible, in a corresponding valve position of the 3/2-way valve 18 (according to the first embodiment) or in a corresponding valve position of the 5/3-way valve (according to the second embodiment), to set a fourth mode of the system (Use Case 4, for short: UC4=bypass mode B with reduction of the hydraulic resistance & maximum heat recovery), in which a hydraulic resistance is reduced and at the same time a maximum heat recovery for heating the battery 10 is made possible.

Via the path 22, however, in addition or as an alternative thereto, it is possible, in a corresponding valve position of the 3/2-way valve 18 (first embodiment) or of the 5/3-way valve (second embodiment), to set a fifth mode of the system (Use Case 5, for short: UC5=selective overheating protection), in which overheating of the battery 10 is avoided by cooling via the radiator 24.

Figure 5:
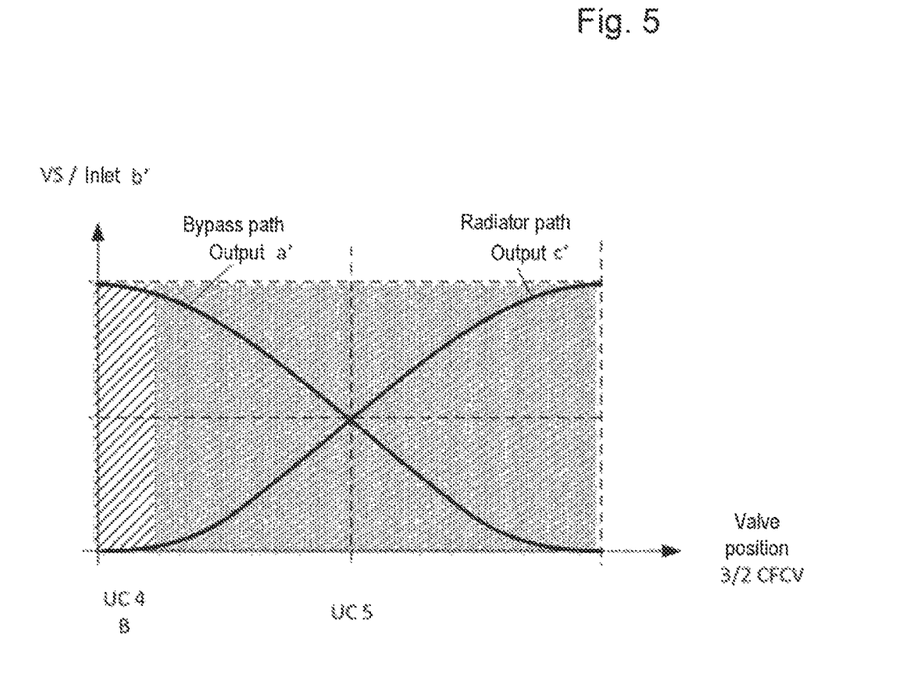
FIG. 5 shows a third illustration of volume flows at a 3/2-way valve of the first embodiment.
Figure 7:
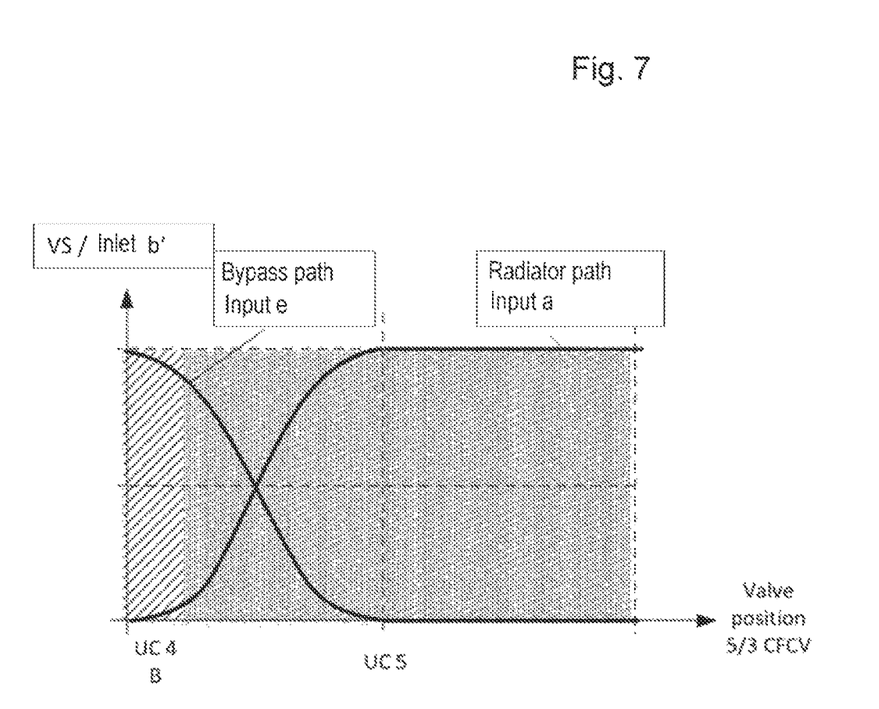
FIG. 7 shows a third illustration of volume flows at the 5/3-way valve of the second embodiment.

The graph in FIG. 5 illustrates the volume flows VS that can be set with respect to the 3/2-way valve of the first embodiment, whereas the graph in FIG. 7 illustrates the volume flows VS that can be set with respect to the 5/3-way valve of the second embodiment. In FIG. 5, the input $b^I$ and the two outputs $a^I$, $c^I$ of the 3/2-way valve are seen. In FIG. 7, however, the volume flows VS through the inputs a, e of the 5/3-way valve are described, specifically based on the volume flow VS through the inlet $b^I$ to the junction KP downstream of the electric motor 12, at which junction the bypass path 20 and the radiator path 22 originate.

The graph in FIG. 7 is compressed in relation to the graph in FIG. 5. This is because, in the case of the second embodiment, there is no second, separate multi-way valve which can be switched independently of the first multi-way valve. In this respect, there is to a certain extent no degree of freedom of adjustment with regard to FIG. 7, and therefore closing input a is accompanied by opening input e, and vice versa.

Although exemplary embodiments are explained in the above description, it should be noted that numerous modifications are possible. It should be noted, furthermore, that the exemplary embodiments are merely examples which are in no way intended to limit the scope of protection, the applications, and the design. Instead, the above description gives a person skilled in the art a guideline for the implementation of at least one exemplary embodiment, wherein various changes may be made, especially with regard to the function and arrangement of the integral parts described, without departing from the scope of protection as it is apparent from the claims and combinations of features equivalent thereto.

The invention claimed is:

1. A thermal management system (2) for use in a vehicle, comprising:
   a first cooling circuit (4) for cooling a battery (10); and
   a second cooling circuit (6) for cooling an electric motor (12) configured to drive the vehicle,
   wherein the first and second cooling circuits (4, 6) are configured to be connected to each other in three separate configurations comprising:
   (a) in series by a multi-way valve (14) in a first mode of the thermal management system (2) and in a first valve position of the multi-way valve (14),
   (b) in parallel in a second mode of the thermal management system (2) and in a second valve position of the multi-way valve (14), and
   (c) in a third mode of the thermal management system (2) and in a third valve position, the multi-way valve (14) takes up an intermediate position in which coolant flows of the first and second cooling circuits (4, 6) are mixed with each other as needed.

2. The thermal management system (2) as claimed in claim 1, wherein the multi-way valve (14) is configured as a 4/2-way valve.

3. The thermal management system (2) as claimed in claim 2, wherein the thermal management system (2) further comprises a further multi-way valve (18) in the second cooling circuit (6) downstream of the electric motor (12), the further multi-way valve (18) being configured to conduct a coolant flow optionally via a path (22) with a radiator (24) and/or via a bypass path (20) parallel to the path (22) so as to bypass the radiator (24).

4. The thermal management system (2) as claimed in claim 3, wherein the further multi-way valve (18) is configured as a 3/2-way valve.

5. The thermal management system (2) as claimed in claim 1, wherein the multi-way valve (14) is configured as a 5/3-way valve which is fluidically connected to a bypass path (20) of the second cooling circuit (6) for bypassing a radiator (24) and a radiator path (22) with the radiator (24),
   wherein the bypass path (20) is parallel to the radiator (24) and the radiator path (22) with the radiator (24),
   wherein the bypass path (20) and the radiator path (22) originate from a junction (KP) downstream of the electric motor (12).

6. The thermal management system (2) as claimed in claim 1, wherein the third valve position can be set from a plurality of possible intermediate positions.

7. The thermal management system (2) as claimed in claim 6, wherein individual intermediate positions can be set in increments or infinitely variably.

8. The vehicle comprising the thermal management system (2) as claimed in claim 1.

9. A method for operating the first and second cooling circuits (4, 6) of the thermal management system (2) as claimed in claim 1, the method comprising:
   cooling the battery (10) using the first cooling circuit (4);
   cooling the electric motor (12) using the second cooling circuit (6) to cool the electric motor (12);
   connecting the first and second cooling circuits (4, 6) to each other:
   in series by the multi-way valve (14) in the first mode of the thermal management system (2) and in the first valve position of the multi-way valve (14), or
   in parallel in the second mode of the thermal management system (2) and in the second valve position of the multi-way valve (14); and
   in a third mode of the thermal management system (2) and in a third valve position of the switching the multi-way valve (14), into an intermediate position in which the coolant flows of the first and second cooling circuits (4, 6) are mixed with each other as needed.

10. The method as claimed in claim 9, wherein a 4/2-way valve is used as the multi-way valve (14).

11. The method as claimed in claim 10, wherein a further multi-way valve (18) is used in the second cooling circuit (6) downstream of the electric motor (12), through which a coolant flow is conducted optionally via a path (22) with a radiator (24) and/or via a path (20) parallel thereto (bypass path 20) for bypassing the radiator (24).

12. The method as claimed in claim 11, wherein a 3/2-way valve is used for the further multi-way valve (18).

13. The method as claimed in claim 9, wherein a 5/3-way valve is used as the multi-way valve (14), which is fluidically connected to a bypass path (20) of the second cooling circuit (6) for bypassing a radiator (24) and a radiator path (22) with the radiator (24),
   wherein the bypass path (20) is parallel to the radiator (24) and the radiator path (22) with the radiator (24),
   wherein the bypass path (20) and the radiator path (22) originate from a junction (KP) downstream of the electric motor (12).

14. The method as claimed in claim 9, wherein the third valve position is set from a plurality of possible intermediate positions.

15. The method as claimed in claim 14, wherein individual intermediate positions are set in increments or infinitely variably.

16. The method as claimed in claim 11, wherein a fourth mode (or bypass mode) and/or a fifth mode of the thermal management system is set, wherein, in the fourth mode, coolant is conducted via the bypass path (20) for heating the battery (10), whereas, in the fifth mode, coolant is conducted via the radiator path (22) for cooling the battery (10).

17. A non-volatile computer readable medium storing a computer program which, when executed on a computer, controls carrying out the method as claimed in claim 9.

* * * * *